(12) United States Patent
Tassin (10) Patent No.: US 9,730,853 B2
(45) Date of Patent: Aug. 15, 2017

(54) APPARATUS FOR REDUCING SYMPTOMS OF NEURODEGENERATIVE DISEASES

(75) Inventor: Stefano Tassin, Rovio (CH)

(73) Assignee: ECKER TECHNOLOGIES SAGL, Lugano (TI) (CH)

(*) Notice: Subject to any disclaimer, the term of this patent is extended or adjusted under 35 U.S.C. 154(b) by 882 days.

(21) Appl. No.: 13/521,482

(22) PCT Filed: Jan. 22, 2010

(86) PCT No.: PCT/IB2010/050279
§ 371 (c)(1),
(2), (4) Date: Jul. 11, 2012

(87) PCT Pub. No.: WO2011/089475
PCT Pub. Date: Jul. 28, 2011

(65) Prior Publication Data
US 2013/0006155 A1 Jan. 3, 2013

(51) Int. Cl.
*A61H 39/04* (2006.01)
*A61H 1/00* (2006.01)
(Continued)

(52) U.S. Cl.
CPC ........... *A61H 1/008* (2013.01); *A61H 1/0266* (2013.01); *A61H 15/0078* (2013.01);
(Continued)

(58) Field of Classification Search
CPC ............... A61H 1/0237; A61H 1/0266; A61H 2001/027; A61H 9/00; A61H 9/0007; A61H 9/0071; A61H 23/00; A61H 23/006; A61H 23/02; A61H 23/0218; A61H 23/0254; A61H 23/04; A61H 35/006; A61H 39/007; A61H 39/02; A61H 39/04; A61H 2201/12; A61H 2201/1207; A61H 2201/123; A61H 2201/1238; A61H 2201/1246; A61H 2201/164; A61H 2201/1642; A61H 2201/1664; A61H 2201/1666;
(Continued)

(56) References Cited

U.S. PATENT DOCUMENTS 2,397,428 A 3/1946 Moshier
3,283,708 A 11/1966 Yackel
(Continued)

FOREIGN PATENT DOCUMENTS

CA 2110665 A1 6/1995
JP H036337 U 2/1991
(Continued)

*Primary Examiner* — Justine Yu
*Assistant Examiner* — Michael Tsai
(74) *Attorney, Agent, or Firm* — Lucas & Mercanti, LLP (57) ABSTRACT

Method and apparatus for improving mobility in patients affected by a neurodegenerative disease, through controlled and localized mechanical stimulation of the foot, at the tip of the big toe and the lower big toe metatarsal joint. Described herein is an apparatus comprising stimulators for the right and left foot and it attains such mechanical stimulation according to predetermined intensity parameters, stimulation sequence, duration and cyclical repetition. Mobility improvement was observed in particular in patients affected by Parkinson's disease.

22 Claims, 4 Drawing Sheets

(51) Int. Cl.
   *A61H 1/02* (2006.01)
   *A61H 15/00* (2006.01)
   *B62J 1/00* (2006.01)

(52) U.S. Cl.
   CPC .............. *A61H 39/04* (2013.01); *B62J 1/002* (2013.01); *B62J 1/007* (2013.01); *A61H 1/0262* (2013.01); *A61H 2001/027* (2013.01); *A61H 2015/0042* (2013.01); *A61H 2201/0192* (2013.01); *A61H 2201/1215* (2013.01); *A61H 2201/164* (2013.01); *A61H 2201/1642* (2013.01); *A61H 2201/1645* (2013.01); *A61H 2201/5002* (2013.01); *A61H 2201/5007* (2013.01); *A61H 2201/5015* (2013.01); *A61H 2205/12* (2013.01)

(58) Field of Classification Search
   CPC .... A61H 2201/5061; A61H 2201/5071; A61H 2205/12; A61H 2205/125
   See application file for complete search history.

(56) References Cited

U.S. PATENT DOCUMENTS

| | | | |
|---|---|---|---|
| 3,286,708 A | | 11/1966 | Gärtner |
| 3,683,896 A | * | 8/1972 | Peplin .................. A61H 23/02 601/16 |
| 4,852,553 A | | 8/1989 | Voykin |
| 4,862,875 A | * | 9/1989 | Heaton .......................... 601/26 |
| 5,029,575 A | * | 7/1991 | Zhivotchenko et al. ....... 601/27 |
| 5,228,431 A | * | 7/1993 | Giarretto ................ A61H 9/005 601/11 |
| 5,241,953 A | * | 9/1993 | Sykes ..................... A61H 9/00 601/165 |
| 5,681,266 A | | 10/1997 | Lin |
| 6,030,408 A | * | 2/2000 | Kramer ........................ 606/204 |
| 6,293,916 B1 | * | 9/2001 | Alviso .................. A61H 7/001 601/134 |
| 6,742,289 B2 | * | 6/2004 | Celmo ................ A43B 7/1465 36/141 |
| 7,487,606 B2 | * | 2/2009 | Koo et al. ...................... 36/141 |
| 2001/0056250 A1 | | 12/2001 | Manor |
| 2006/0235465 A1 | | 10/2006 | Koo et al. |
| 2007/0270727 A1 | * | 11/2007 | Khorassani Zadeh . A61H 1/008 601/120 |
| 2010/0106050 A1 | * | 4/2010 | Lau ..................... A61H 39/007 600/557 |

FOREIGN PATENT DOCUMENTS

| | | |
|---|---|---|
| JP | 2000317013 A | 11/2000 |
| JP | 2004329606 A | 11/2004 |
| JP | 2009108429 A | 5/2009 |
| RU | 1832023 C | 8/1993 |
| WO | 97/00701 A2 | 1/1997 |
| WO | 2006/081883 A2 | 8/2006 |

* cited by examiner

APPARATUS FOR REDUCING SYMPTOMS OF NEURODEGENERATIVE DISEASES

CROSS-REFERENCE TO RELATED APPLICATION

This application is a 371 of PCT/IB2010/050279, filed Jan. 22, 2010, the contents of which are incorporated herein by reference.

FIELD OF THE INVENTION

The invention regards the treatment of symptoms of neurodegenerative diseases, in particular Parkinson's disease, or symptoms deriving from cerebral ischemia. In particular, the invention regards treatment to improve the mobility of patients affected by such diseases. Furthermore, the invention regards an apparatus for the implementation of such treatment.

BACKGROUND OF THE INVENTION

The most common therapy for Parkinson's disease is still the pharmacological treatment based on taking dopamine (L-dopa or levodopa), given that it is known that the disease is caused by the degeneration of the dopamine-producing neurons. This therapy is capable of limiting the symptoms, at least in the short term, but it has various and serious adverse effects among which vomiting, anorexia, hypertension, psychical disturbance and arrhythmia. Generally, the patient is forced to take other drugs to control the adverse effects of the therapy. There is a considerable alternation of the patient's response, with periods of therapy refractoriness; furthermore, it is known that the efficiency of said therapy reduces considerably after a few years of treatment. There is also a therapy based on direct electrical stimulation of the brain usually used in patients at an advanced stage of the disease and/or suffering from serious adverse effects of levodopa. Said therapy provides for surgical implantation of electrodes and thus it is extremely invasive. Other therapies are still at study level and quite far from practical availability for patients.

Hence, currently, the most common and actually the only means for symptomatic treatment of Parkinson's disease consists in drugs that must be taken continuously, such drugs creating dependence and causing serious adverse effects.

There is a serious need for a therapy capable of reducing symptoms of Parkinson's disease. It is known that this disease may evolve slowly over several years, during which the patient gradually loses self-reliance due to tremors, rigidity, dyskinesia, postural and deglutition disorders, etc. . . . In particular, the strong reduction of the mobility capacity has a negative effect on the independence of the patient. The patient suffers from slowness and difficulties to stand up, walk and turn around. Very often, the disease affects people at advanced age and worsens an already partly reduced mobility capacity. Within a few years, most of these people are no longer self-reliant and need almost constant assistance, with the ensuing high social costs. The pharmacological treatment used up to date does not satisfactorily meet this need.

Similar arguments may be raised regarding other neurodegenerative diseases or regarding the consequences of an ischemic attack which likewise reduce the mobility capacity and, thus, the self reliance of the patient. In these cases, either the drugs are not efficient or they cause serious adverse effects.

SUMMARY OF THE INVENTION

The inventors discovered a surprising improvement of the mobility capacity and more generally walking capacity, in patients affected by neurodegenerative diseases such as the Parkinson's disease, following a controlled and localised mechanical stimulation treatment of the foot. More in particular, said stimulation is localised at the tip of the big toe and an area of the sole of the foot which substantially corresponds to the lower big toe metatarsal joint.

The stimulation is carried out according to predetermined treatment parameters comprising at least the mechanical stimulation intensity, a stimulation sequence of said parts of the foot, the duration of each step of mechanical stimulation, and optionally a repetition of the sequence for a defined number of cycles.

Preferably, the treatment sequence regards both the right and the left foot. More specifically, an aspect of the invention consists in a treatment comprising the steps of mechanically stimulating:
  a) the tip of the right big toe:
  b) an area beneath the sole of the left foot corresponding to the lower left big toe metatarsal joint;
  c) an area beneath the sole of the right foot corresponding to the lower right big toe metatarsal joint;
  d) the tip of the left big toe.

The term "mechanical stimulation" is used to indicate the attainment of an operating pressure, corresponding to feeling of a "stimulus" threshold by the patient. Regarding the present invention, such threshold is defined as the pain or stimulus threshold. The correct operating pressure shall be determined depending on the case, given that it varies according to the patient's clinical condition and in particular according to the age of the patient and the state of advancement of the neurodegenerative disease as well as subjective sensitivity. Generally, the attainment of said threshold corresponds to the occurrence of the patient's reflex to withdraw the leg or foot. It was observed that by using—for mechanical stimulation—1.5-2.5 mm diameter spherical-headed tips, the force imparted to the tip in order to attain said operating pressure is usually comprised between 2 and 3.5 kg; However, a more or less intense stimulation may be used, without departing from the invention, depending on the subjective characteristics of the patient.

The treatment may be also performed manually but, preferably, it is automated by a series stimulators each provided with a member for contact with the foot, for example a rounded-off tip.

The sequence preferably comprises the steps of stimulating said areas of the right and left foot following the order a), b), c), d), obtaining a mechanical stimulation, in the following order: right big toe tip, lower left big toe metatarsal joint, lower right big toe metatarsal joint, left big toe tip. However, such order shall not be considered limiting with respect to the present invention. The stimulation of the foot according to the invention may comprise any succession of stimulation on the parts of the foot defined above. For example, an inverse order may be followed from d) to a), or any other order may be followed.

More preferably, the treatment sequence is such that the abovementioned areas of the body are stimulated separately. This implies that at any time of the treatment, the mechanical stimulation is equivalent or greater than the operating (or threshold) pressure defined above in only one of the areas to be subjected to treatment, for example area a), b), c) or d). The "idle time" that elapses between the interruption of the stimulus in an area, for example area a), and the attainment of the operating pressure in the subsequent area, for example area b), is preferably about 1-2 seconds.

The duration and number of cycles may likewise be determined according to the overall clinical picture of the patient. In patients affected by Parkinson's disease optimal results were obtained with each stimulus lasting from 5 to 10 seconds, preferably 6 seconds, and the number of repetitions of said stimulation sequence a)-b)-c)-d) indicatively between 5 and 10 repetitions.

A preferred embodiment of the treatment, in particular for patients affected by Parkinson's disease, provides for repeating the stimulation sequence a)-b)-c)-d) for 5-10 cycles; stimulation using a 1.5-2.5 mm, preferably 1.8 mm, spherical-headed tip and the pressure to be determined on experimental basis, indicatively falling within 2-3.5 kg. Under particular conditions of hyposensitivity or hypersensitivity, values greater or lower than said limits—herein indicated strictly for exemplification purposes—may be used.

A second aspect of the invention consists in an apparatus for performing the treatment described above. The apparatus may be made according to different variants from a construction point of view, not essential as regards with the invention. For example, the apparatus may comprise two devices respectively applicable to the right and left foot of the patient, or two accommodations for the feet, provided with the required mechanical stimulation devices, and a suitable control system.

According to a possible embodiment, an apparatus for mechanically stimulating the foot is provided, comprising at least one first mechanical stimulator arranged to operate, during use, on the tip of the big toe, and a second mechanical stimulator arranged to operate, during use, on an area localised beneath the sole of the foot and substantially corresponding to the lower big toe metatarsal joint; said apparatus further comprising a control system suitable to actuate said mechanical stimulators according to a treatment programme comprising at least one mechanical stimulation intensity, a predetermined sequence for stimulating said parts of the foot, a predetermined duration of each mechanical stimulation step, and optionally a repetition of said sequence.

According to the most preferred embodiment, provided for is an apparatus comprising a first mechanical stimulator, a second mechanical stimulator, a third mechanical stimulator, a fourth mechanical stimulator wherein: said first mechanical stimulator is arranged to operate, during use, on the tip of the right big toe of a patient; said second mechanical stimulator is arranged to operate, during use, in an area beneath the sole of the left foot corresponding to the lower big toe metatarsal joint; said third mechanical stimulator is arranged to operate, during use, in an area beneath the sole of the right foot corresponding to the lower big toe metatarsal joint; said fourth mechanical stimulator is arranged to operate, during use, on the tip of the left big toe; and furthermore the control system is prearranged for the actuation of said first, second, third and fourth stimulator according to said treatment programme.

Preferably, the control system is prearranged for the sequence actuation of said first, second, third and fourth stimulator, causing the mechanical stimulation, according to the predetermined sequence, of the areas of the body a), b), c), d) described above.

The apparatus preferably comprises suitable adjustment means for positioning the stimulators at the areas of the foot or feet subjected to treatment, for example the previously indicated zones a), b), c), d). Furthermore, the apparatus preferably comprises suitable means for fastening against the feet to maintain the proper position during treatment, for example straps with adjustable fastening means or the like, as well as, suitable means for adjusting and adapting to the morphology of the foot. In a preferred embodiment, for example, the apparatus comprises a front support—adjustable in a tilting manner—for the toes, and a rear support for the heel area, also adjustable and spaceable from the front support, adapting to various sizes. More preferably, in order to facilitate selective stimulation of the tip of the toe, said toe support comprises a partitioning element or spacer for separating the toe from the rest of the toes, and allow accurate application of pressure on the tip of the toe.

The stimulators may be made according to per se known art and according to various embodiments, not essential as regards with the present invention. In a preferred embodiment, a stimulator is substantially made up of a motor which—through a rotating spindle and a female-screw coupling—causes the translation of an actuator. The motor-actuator unit is mounted on adjustable supports. Power supply is preferably low voltage (6-12 V) or battery powered.

Further construction details such as the use of non-allergic, easily washable material etc. . . . and which are clear to a man skilled in the art, shall be provided for in compliance with the law and contingent requirements.

The control system preferably comprises at least one processing unit, an internal memory unit and a data interface connection with the external, of the per se known type such as for example a USB port, network plug or equivalent means for transmitting and receiving data. Said interface may be one or two-directional. Said interface may be used in particular for loading a specific programme, prepared by a specialist, for the patient. According to further variants, the apparatus may be controlled by a processor or by an external control unit. The control system may also comprise a function for the "historical" recording of the treatments on suitable storage means.

For example, the treatment therapy may comprise the following fundamental steps. The first step consists in performing neurological tests on the patient and determining the most suitable treatment parameters, in particular: detecting the stimulus threshold of the patient and determining the pressure and/or the travel of the actuators to attain the correct operating pressure; determining the duration of each stimulation and the number of cycles per treatment session. Thus, the specialist, may prepare a series of treatment parameters, for example with the help of a special software programme, and transfer them to the control system of the apparatus subject of the present invention. The apparatus may thus be used at home directly by the patient or by a person assisting the patient, without requiring any medical specialisation, given that it operates with a preloaded programme.

The invention has the evident capacity of obtaining surprising improvement of the mobility of patients affected by Parkinson's disease, as outlined more in detail in the following detailed description. In particular the treatment according to the invention is capable of reducing symptoms such as akinesia, tremors, slowness and rigidity of movement over time in a surprising and long-lasting manner. The treatment, based on a purely mechanical stimulation of selective areas of the foot, does not have the adverse effects of a pharmacological treatment; it is repeatable without limits and has no adverse effects.

A further and important advantage of the invention is that the treatment neither requires hospital facilities nor qualified personnel. The apparatus that provides the treatment is easy to manufacture and substantially requires power supply alone, which can be supplied from the mains or by batteries. The use of the apparatus and starting the treatment are possible even in the home environment, with apparent advantage in terms of self-reliance of the patient. This particularly important for controlling the symptoms of a disease such as the Parkinson's disease which, as known, is not fatal per se and may have a course characterized by slow advancement over time. The contribution of the specialist is limited to defining treatment parameters, which may be updated periodically and "loaded" into the internal memory of the control system; normal use is substantially attainable by anyone, due to the fact that the treatment parameters are preset and memorized in the machine.

Improvement is clearly observable especially regarding the patients' capacity to stand up, walk and turn around. As known, the ability to perform such task's are strongly reduced and slowed down by the Parkinson's disease. It is deemed that the stimulation of the selected areas of the foot operates as a targeted stimulation of the nervous system and in particular of the areas of the brain having the task of controlling mobility, with the effect of temporarily compensating "regression" caused by the disease, without this being interpreted as restrictive as regards with the present patent. It has been observed that the effects generally last a few days; however, the treatment can be repeated frequently due to the substantial absence of contraindications and adverse effects.

A further advantage lies in the low cost, especially compared to the benefits obtained, hence making the treatment available to almost everyone.

Characteristics and advantages shall be more apparent from the following detailed description and with the help of the attached figures.

DETAILED DESCRIPTION OF A PREFERRED EMBODIMENT

Figure 1:
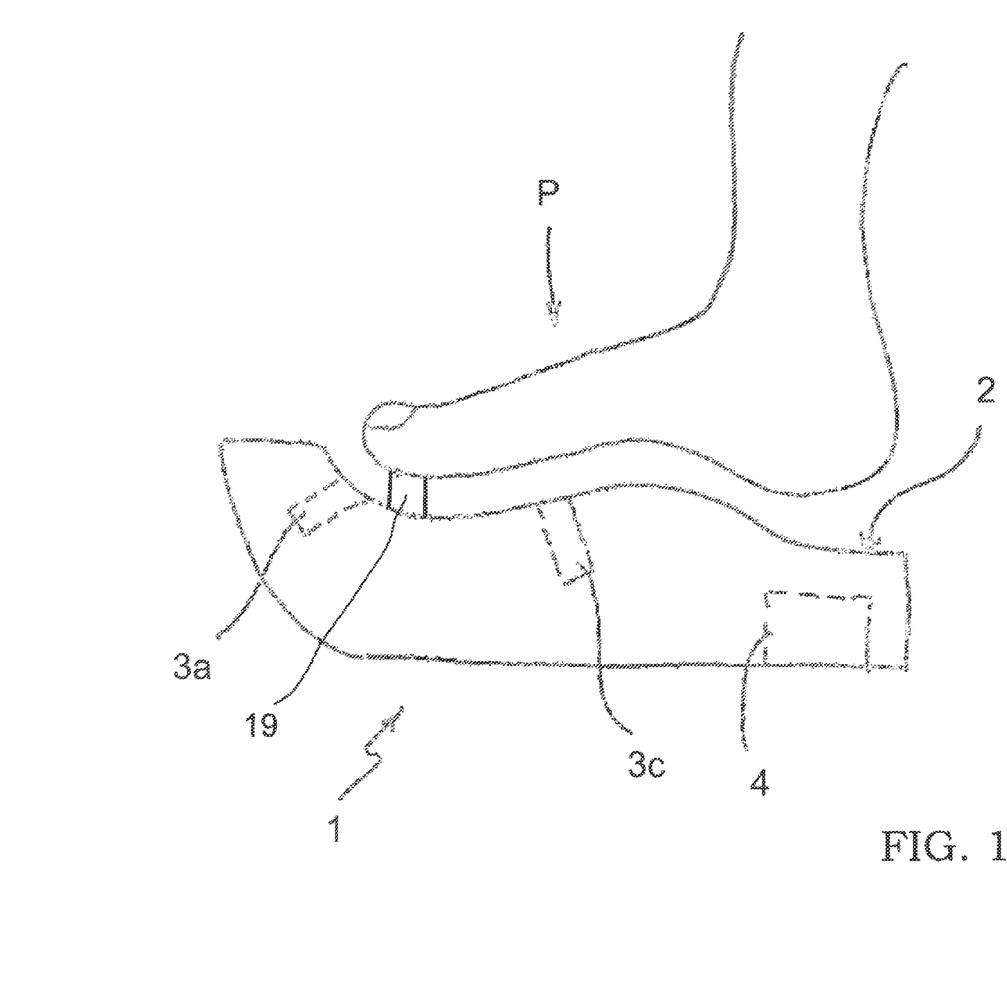
FIG. 1 schematically shows the use of a stimulation apparatus according to one of the various embodiments of the invention.

FIG. 1 shows a device 1 applicable to the right foot P of a patient, and comprises an anatomic surface 2 for accommodating the foot, where two stimulators 3a, 3c are respectively positioned in a front area and in a central area of said surface 2. When the device 1 is correctly secured to the foot P, in the use position, the stimulator 3a is capable of causing a mechanical stimulus on the tip of the big toe, while the stimulator 3c is capable of operating on an area of the sole substantially corresponding to the lower big toe metatarsal joint.

Said stimulators are made according to per se known art and may comprise, for example, an electric motor associated to a linear actuator, having a rounded tip contact member intended to exert pressure directly onto the tip of the big toe or the metatarsal joint.

The surface 2 preferable comprises an adjustable front support for the toes (described below) and/or a separator/partitioning element 19 (the separator/partitioning element is shown only schematically in FIG. 1) for spacing the big toe from the other toes. The device 1 may be secured to the foot P, during treatment, using a fastening element of a per se known type (for example Velcro).

Figure 2:
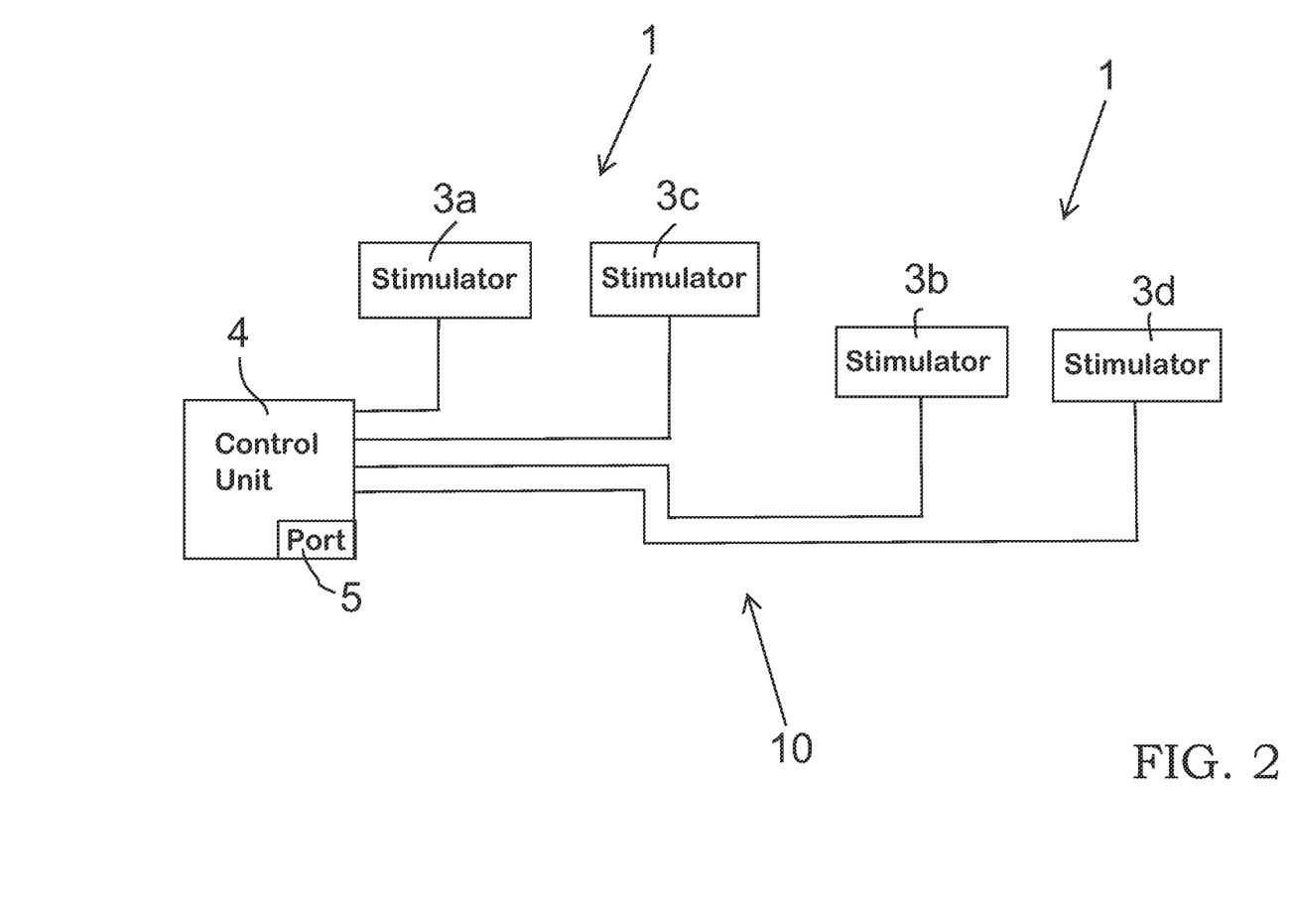
FIG. 2 shows a simplified diagram of the control system of the stimulators in an apparatus according to the invention.

Preferably used for treatment is an apparatus 10 comprising two devices of the type illustrated above, respectively one device 1 for the right foot and an analogous device 1' for the left foot comprising further mechanical stimulators 3b and 3d, as exemplified in the diagram of FIG. 2.

The apparatus 10 is provided with a control unit 4 which commands a series of mechanical stimulators 3a, 3b, 3c and 3d arranged to operate on the areas of the feet subjected to treatment. The first stimulator 3a operates on the tip of the right big toe; the second and the third stimulator 3b and 3c operate on areas beneath the sole of the feet corresponding to the lower metatarsal joint respectively of the right (stimulator 3b) and left (stimulator 3c) big toe. The fourth stimulator 3d operates on the tip of the left big toe.

The control unit 4 commands the stimulators—in sequence—according to a predetermined treatment programme, which for example may be contained in an internal memory of the same control unit 4. The control unit 4 is also provided with at least one port 5 for communicating with the external environment, according to a standard preferably selected from among the most common ones in the information technology industry (for example USB), so as to allow loading a treatment programme. Provided for in various embodiments may be ports even for remote connection, for example network plugs or equivalent connections according to the known art and the contingent requirements.

Figure 3:
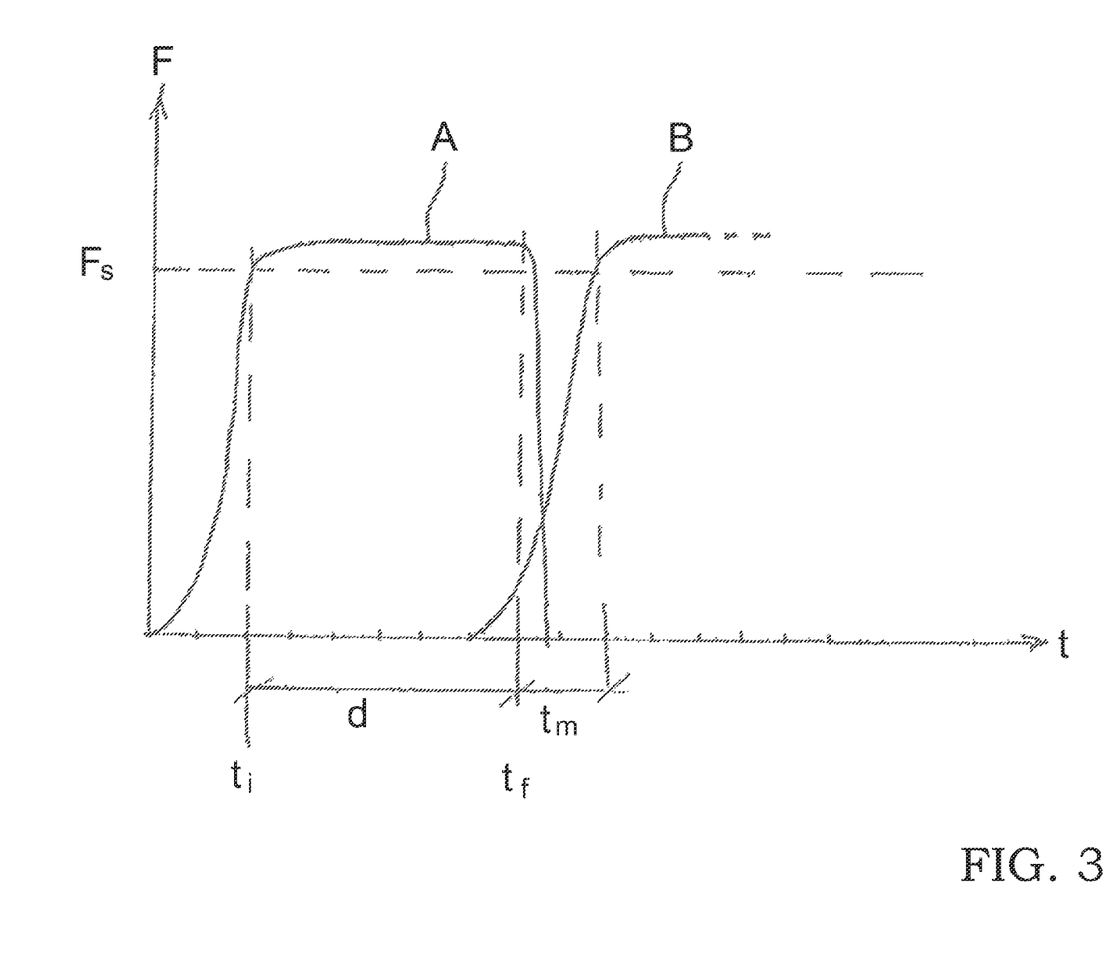
FIG. 3 shows a possible form of the stimulation intensity curves over time.

An example of the actuation logic of the stimulators as a function of time t is given in FIG. 3. Each of the stimulators 3a-3c comprises an actuator having a contact member, such as a rounded tip, capable of mechanically stimulating the foot. The intensity of the stimulation may be expressed in terms of force F exerted by said actuator. In order to attain an effective outcome, such force must exceed a threshold Fs variable depending on the conditions of the patient, which must correspond to the pain or stimulus threshold, at which the patient shows an involuntary reflex of withdrawing the foot.

Curve A of FIG. 3 refers to the actuation of the first stimulator 3a having the task of stimulating the tip of the right big toes. The motor of the stimulator requires a transient time to attain the preset operating intensity, equivalent or slightly exceeding the threshold value Fs. Such intensity is maintained from a start of stimulus time $t_j$ to an end of stimulus time $t_f$, for the duration of a single stimulus d typically amounting to a few seconds, for example 6 seconds.

The rising "ramp" of curve A corresponds to the time physically required by the actuator of the stimulator 3a to touch the tip of the big toe and attain the desired pressure. This time may for example amount to 1-2 seconds. At the end of treatment time, the stimulus intensity (curve A) decreases rapidly. Curve B shows the intervention of the subsequent stimulator according to the sequence preset for example in the stimulator 3b which operates on the area of the lower right big toe metatarsal joint. As can be seen, the stimulator 3b is preferably actuated slightly in advance (for example one second) with respect to the end of stimulus time stimulator 3a. Thus, the rising ramp of curve B is overlapped to the falling ramp of curve A, thus reducing absence of stimulus idle time $t_m$.

The same control logic is repeated when stimulators 3c and 3d intervene. The sequence is then repeated cyclically, for a variable number of cycles, for example 5-10 cycles. The overall duration of the treatment may thus amount to a few minutes, for example about 8-10 minutes.

Figure 4:
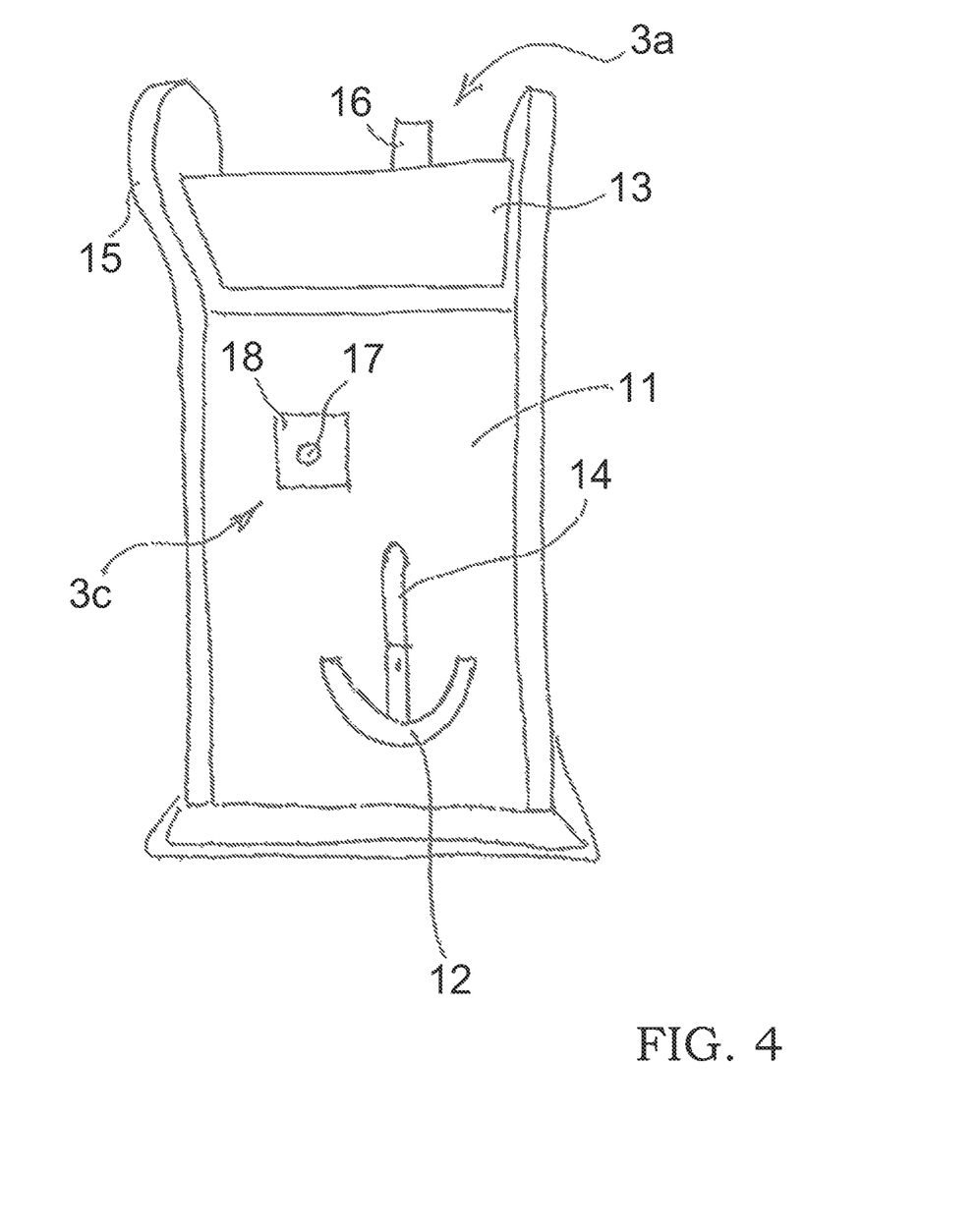
FIG. 4 shows one of the possible embodiments of an apparatus according to the invention.

One of the possible embodiments, is shown in FIG. 4 for indicative purposes. A device for applying the treatment to the right foot essentially comprises a base 11 for accommodating the foot, having a rear support 12 for accommodating the heel and a bitable front support 13, for accommodating the toes. The rear support 12 is adjustable by making it slide into a slot 14 with respect to the base 11. The support 13 is pivoted to the sides 15 of the device, and it is tiltable for example between 0 and 90 degrees with respect to the support base 11 surface.

The stimulators 3a and 3c in the example are provided with actuators 16 and 17. The actuator 16 is fixed to the front support 13, and the actuator 17 is fixed beneath the base 11 and operates through an opening 18. Both actuators have an adjustable position through per se known means (for example stop screws).

Further characteristics, merely for exemplification purposes, are as follows. Each of the stimulators comprises a small electric motor with a rotating spindle which activates the respective actuator. The actuator is made up of a screw having an internal milling suitable to be accommodated over the spindle itself. The member intended to come into contact with the foot is obtained for example from a solid bronze bar, with an internal threading suitable to engage the screw, and turned having a round-tipped end suitable to serve as a stimulator. The base of said bronze stimulator has two projections that serve as stop means, the entire assembly being guided by a Teflon guide which ensures that the actuator operates in an accurate and simple manner. The tip of the actuator projects 0 to 20 mm from the containment cage.

It should be understood that the construction details may vary widely and thus they may be subjected to variations according to the applications of the known state of the art.

The treatment subject of the invention was applied to about 200 patients affected by Parkinson's disease. The patients were treated by mechanically stimulating the areas of the right and left foot described previously above, following the a) b) c) d) sequence, each stimulus lasting about 5-6 seconds and with repetition of 5 cycles. All cases observed showed clear improvement of mobility with the duration of the effects varying between 2-3 days and about 7-10 days depending on the patient and level of the disease progression.

The invention claimed is:

1. A method for treating mobility handicap in a patient affected by a neurodegenerative disease, comprising:
    treating the mobility handicap in the patient by performing mechanical stimulation steps for controlled and localized mechanical stimulation of one foot of the patient at a plurality of selected areas of the foot, the mechanical stimulation steps consisting of stimulation of a tip of the big toe and stimulation of a lower big toe metatarsal joint, respectively, said method being implemented according to predetermined parameters comprising a predetermined mechanical stimulation intensity, and at least one of a predetermined sequence for stimulating said selected areas of the foot and a predetermined duration of each of the mechanical stimulation steps, the step of treating comprising adjusting a tiltable front support of a base accommodating the one foot of the patient, the tiltable front support supporting the toes of the one foot of the patient, being tiltable with respect to a surface of the base, and having an actuator fixed thereto for performing the stimulation of the tip of the big toe, and
    a neurological test step, performed prior to the mechanical stimulation steps, of detecting the predetermined mechanical stimulation intensity to be used at the plurality of selected areas of the foot in the mechanical stimulation steps by determining an operating pressure at the plurality of selected areas of the foot corresponding to an occurrence of a patient's reflex to withdraw a leg or the foot of the patient.

2. The method according to claim 1, wherein the step of treating further includes further mechanical stimulation steps performed on a second foot of the patient, the mechanical stimulation steps and the further mechanical stimulation steps consisting of mechanically stimulating:
    a) the tip of the right big toe;
    b) an area beneath the sole of the left foot corresponding to the lower left big toe metatarsal joint;
    c) an area beneath the sole of the right foot corresponding to the lower right big toe metatarsal joint; and
    d) the tip of the left big toe.

3. The method according to claim 2, wherein said mechanical stimulation steps and the further mechanical stimulation steps are performed according to the following order a), b), c), and d).

4. The method according to claim 1, wherein each of the mechanical stimulation steps is operated by a respective contact member having a rounded or substantially spherical tip, having a diameter ranging between 1.5 to 2.5 mm.

5. The method according to claim 1, wherein the mechanical stimulation steps have a substantially equivalent duration with respect to each other.

6. The method according to claim 5, wherein each of the mechanical stimulation steps has a duration in the range between 5 and 10 seconds.

7. The method according to claim 1, wherein the mechanical stimulation steps of each of the selected areas of the foot are performed separately and in sequence, such that the mechanical stimulation is applied to only one of said selected areas of the foot at a time.

8. The method according to claim 1, further comprising the step of using the method to treat a patient affected by Parkinson's disease.

9. The method according to claim 1, wherein the step of treating further comprises separating the big toe of the subject from a remainder of toes of the foot by a partitioning element to thereby facilitate selective stimulation of the tip of the big toe and allow accurate application of pressure on the tip of the big toe.

10. An apparatus for mechanically stimulating one foot of a patient comprising:
    mechanical stimulators consisting of a first mechanical stimulator arranged to operate, during use, on the tip of the big toe, and a second mechanical stimulator arranged to operate, during use, on an area localized beneath the sole of the foot and substantially corresponding to the lower big toe metatarsal joint;
    a base for accommodating the foot of the patient, the base including a tiltable front support supporting the toes of the foot of the patient, the tiltable front support being tiltable with respect to a surface of the base and including the first mechanical stimulator fixed thereto; and
    a control system suitable to actuate said mechanical stimulators according to a treatment program comprising a predetermined mechanical stimulation intensity, and at least one of a predetermined sequence for stimulating said parts of the foot and a predetermined duration of each mechanical stimulation step;

wherein said control system is configured to perform a neurological test step detecting the predetermined mechanical stimulation intensity to be used by the first mechanical stimulator and the second mechanical stimulator by determining an operating pressure at the tip of the big toe and the lower big toe metatarsal joint corresponding to an occurrence of a patient's reflex to withdraw a leg or the foot of the patient.

11. The apparatus according to claim 10, further comprising a plurality of mechanical stimulators for a second foot of the patient consisting of a third mechanical stimulator and a fourth mechanical stimulator wherein:

said first mechanical stimulator is intended to operate, during use, on the tip of the right big toe of a patient;

said fourth mechanical stimulator is intended to operate, during use, in an area beneath the sole of the left foot corresponding to the lower big toe metatarsal joint;

said second mechanical stimulator is intended to operate, during use, in an area beneath sole of the right foot corresponding to the lower big toe metatarsal joint:

said third mechanical stimulator is intended to operate, during use, on the tip of the left big toe; and furthermore the control system is arranged for the actuation of said first, second, third and fourth stimulator according to said treatment program.

12. The apparatus according to claim 11, wherein said control system is arranged to obtain the actuation of said stimulators in the order of said first, fourth, second, and third stimulator.

13. The apparatus according to claim 11, wherein said control system is arranged to actuate said stimulators one at a time such that said first, fourth, second, and third stimulators reach said operating pressure hi order, maintain said operating pressure for a predetermined period of time, and such that at any one time during the execution of a stimulation program only one of said stimulators applies said operating pressure.

14. The apparatus according to claim 11, wherein each of said stimulators comprises a motor and linearly moving member for contact with the foot, said member having a tip for contact with a respective foot, said tip being rounded or substantially spherical.

15. The apparatus according to claim 14, said tip of the contact member having a diameter ranging between 1.5 and 2.5 mm.

16. The apparatus according to claim 11, comprising a first device for treating the right foot and a second device for treating the left foot, said first and said second stimulator being associated to the first device, and said third and fourth stimulator being associated to the second device.

17. The apparatus according to claim 10, wherein said control system comprises a one-way data communication port or two-way data communication port.

18. The apparatus according to claim 10, wherein said base for accommodating the foot further includes an adjustable rear support for accommodating the heel.

19. The apparatus according to claim 10, further comprising a partitioning element configured to separate the big toe of the foot of the patient from a remainder of toes on the foot of the patient to thereby facilitate selective stimulation of the tip of the big toe and allow accurate application of pressure on the tip of the big toe.

20. A method for treating mobility handicap in a patient affected by a neurodegenerative disease using the apparatus for mechanically stimulating the foot according to claim 11, said method consisting of the steps of treating the mobility handicap in the patient by activating said apparatus to mechanically stimulate:

a) the tip of the right big toe;
b) an area beneath the sole of the left foot corresponding to the lower left big toe metatarsal joint;
c) an area beneath the sole of the right foot corresponding to the lower right big toe metatarsal joint; and
d) the tip of the left big toe;

according to treatment parameters comprising a predetermined mechanical stimulation intensity, and at least one of a predetermined sequence for stimulating said parts of the foot and a predetermined duration of each mechanical stimulation step, the step of treating including adjusting the tiltable front support on the base accommodating the foot of the patient, and a neurological test step, performed prior to the steps of activating the apparatus, of detecting the predetermined mechanical stimulation intensity to be used at the plurality of selected areas of the foot in the mechanical stimulation steps by determining an operating pressure at the plurality of selected areas of the foot corresponding to an occurrence of a patient's reflex to withdraw a leg or the foot of the patient.

21. The method according to claim 20, wherein said sequence is sequence a), b), c), and d).

22. The method according to claim 20, wherein the step of treating further comprises separating the right big toe from a remainder of the toes on the right foot by the partitioning element and separating the left big toe from a remainder of toes on the left foot by the partitioning element or another partitioning element.

* * * * *

UNITED STATES PATENT AND TRADEMARK OFFICE
CERTIFICATE OF CORRECTION

PATENT NO. : 9,730,853 B2
APPLICATION NO. : 13/521482
DATED : August 15, 2017
INVENTOR(S) : Stefano Tassin It is certified that error appears in the above-identified patent and that said Letters Patent is hereby corrected as shown below:

In the Claims

Claim 13 on Column 9 should read as follows:
--13. The apparatus according to claim 11, wherein said control system is arranged to actuate said stimulators one at a time such that said first, fourth, second, and third stimulators reach said operating pressure in order, maintain said operating pressure for a predetermined period of time, and such that at any one time during the execution of a stimulation program only one of said stimulators applies said operating pressure.--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*